Dec. 2, 1952      H. C. LYNCH      2,619,865
SALES DEVICE
Filed Sept. 9, 1950
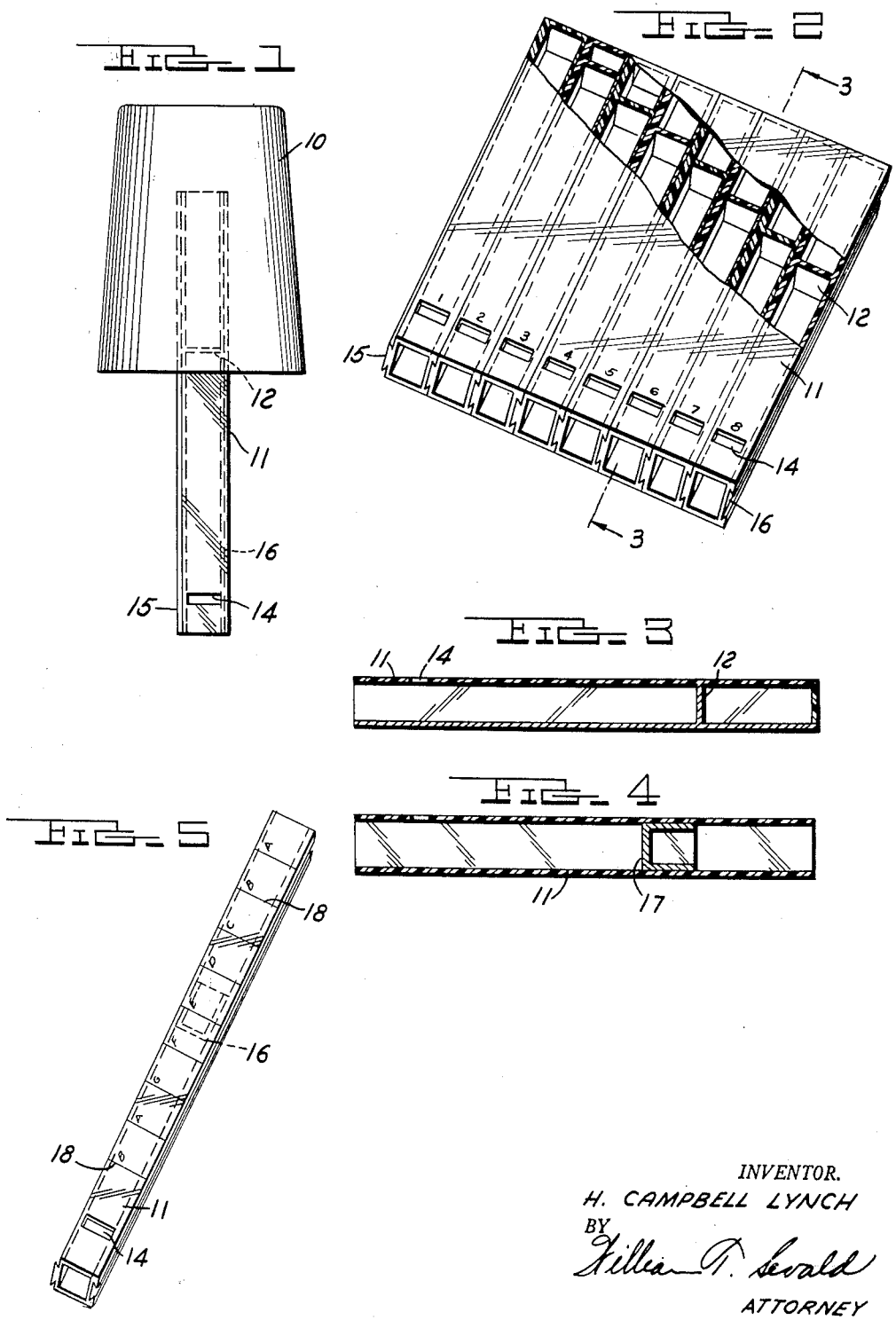
INVENTOR.
H. CAMPBELL LYNCH
BY
*William P. Sevald*
ATTORNEY Patented Dec. 2, 1952

2,619,865

UNITED STATES PATENT OFFICE 2,619,865

SALES DEVICE

Harold Campbell Lynch, Flint, Mich., assignor to Whistle Stop Incorporated, a corporation of Michigan Application September 9, 1950, Serial No. 184,051

3 Claims. (Cl. 84—330)

This invention relates to an ice-cream and confection sales device and more particularly to an individual-portion supporting stick or handle housing a whistle of a certain musical note which is annexable to like sticks of various other musical notes to form a whistle organ having a musical scale of notes such as an octave.

Ice-cream and candy sold on a stick, known as "suckers" to the trade, are a well known commodity on the American market and they are sold under various generic names. However, the supporting stick in nearly every case is a wooden "round" or "flat" which in itself is unattractive and of no particular utility.

It is, therefore, the primary object of the invention to provide a stick for supporting individual portions of ice-cream or other confection which is in itself attractive and a desirable article of purchase to the trade to enhance and facilitate the sale of the ice-cream or other confection.

An object of the invention is to provide a stick which is annexable to like sticks of various musical notes to form a whistle organ of scaled musical notes such as an octave.

These and other objects of the invention will become apparent by reference to the following description of an ice-cream or confection whistle stick and whistle organ embodying the invention taken in connection with the accompanying drawing in which:

Fig. 1 is a side elevation view of an individual ice-cream portion supported on a whistle stick.

Fig. 2 is a perspective view partially broken away to show the interior construction in cross-section of a whistle organ assembled from individual whistle sticks.

Fig. 3 is a cross-sectional view of Fig. 2 taken on the line 3—3 thereof.

Fig. 4 is a view similar to Fig. 3 showing a modified stick having an adjustable stop; and Fig. 5 is a perspective view of the modified stick seen in Fig. 4 showing the scale or note markings for varying the tone of the whistle via the adjustable stop.

Referring now to the drawing wherein like numerals refer to like and corresponding parts throughout the several views, the whistle stick and whistle organ disclosed therein to illustrate the invention comprises an individual ice-cream or confection portion 10, a hollow supporting stick 11, a stop 12 in the central cavity of the stick 11, a side wall opening 14 in the stick 11 constituting a whistle in conjunction with the hollow body 11 and the stop 21, a male tongue, dovetail, or other connecting means 15 on one side of the stick 11, and a complementary female tongue, dovetail, or the connecting means 16 on the opposite side of the stick 11.

A modified form of the invention is disclosed in Figs. 4 and 5 wherein an adjustable stop 17 is endwise movably positioned within the stick 11 and scale or note indications 18 are marked on the stick 11.

The sticks 11 are embedded in the ice-cream 10 and used as a handle for the consumption of the ice-cream. After the ice-cream is consumed, the stick is usable as an individual whistle. When a user has accumulated several sticks 11, he attaches them together via the attaching means 15 and 16 in side-by-side relationship as seen in Fig. 2, to assemble a whistle organ out of the individual sticks 11.

Obviously, if the stops 12 are fixed as seen in Figs. 1, 2, and 3 it will be necessary for the user to accumulate sticks of varying tones so as to comprise a musical scale; whereas, if the stops are adjustable, the user accumulates a group of sticks 11, such as eight, and then adjusts the stops 17 via the scale indication 18 to form a musical scale such as an octave. The sticks may be tuned as any other musical instrument as the scale indications are provided as a guide.

The sticks 11 are preferably made of materials known commercially as "plastics" and preferably of semi-transparent or semi-translucent plastics so that the adjustable stop 16 can be visually positioned. While the stick 11 has been shown having a co-extensive central cavity, it is well known that the cavity can be less than indicated.

Although one embodiment and one modification has been disclosed and described in detail, it is obvious that many changes may be made in the size, shape, detail, and arrangements of the various elements of the invention without departing from the spirit and scope thereof as defined by the appended claims.

I claim:

1. A confection supporting stick comprising a hollow tube having a side wall interruption constituting a whistle, an adjustable stop in said tube for varying the pitch of the whistle, a male dove-tail on one side of said tube, and a female dove-tail on the opposite side of said tube; said dove tails being capable of fitting with the complementary dove-tails of other like tubes to annex said tube with other like tubes to form a whistle organ; said stop in said tube and the stops in the like associated tubes being adjustable to vary the pitch of each tube.

2. A whistle organ consisting of an assembly of confection-supporting sticks each comprising a hollow tube having a side-wall interruption constituting a whistle, a stop in said tube determining the tone of said whistle, a locking groove on one side of said tube, and a complementary interlocking tongue on the other side of said tube; each said tube being securable to another like tube in side-by-side relationship via said locking groove and said complementary interlocking tongue.

3. In a device as set forth in claim 2, said stops being adjustable to modify the tone of each said tube to facilitate organizing a musical scale.

H. CAMPBELL LYNCH.

REFERENCES CITED

The following references are of record in the file of this patent:

UNITED STATES PATENTS

| Number | Name | Date |
| --- | --- | --- |
| 500,433 | Schubert | June 27, 1893 |
| 870,207 | Weiss | Nov. 5, 1907 |
| 1,723,746 | Myers | Aug. 6, 1929 |
| 1,869,710 | Gilbert | May 31, 1932 |
| 2,035,243 | Minevitch | Mar. 24, 1936 |
| 2,175,006 | Tilson | Oct. 3, 1939 |